(12) United States Patent
Ogasawara et al.

(10) Patent No.: US 9,396,290 B2
(45) Date of Patent: Jul. 19, 2016

(54) HYBRID DATA MANAGEMENT SYSTEM AND METHOD FOR MANAGING LARGE, VARYING DATASETS

(75) Inventors: Gary Hayato Ogasawara, Foster City, CA (US); Michael M. Tso, Redmond, WA (US)

(73) Assignee: Cloudian Holdings, Inc., Foster City, CA (US)

( * ) Notice: Subject to any disclaimer, the term of this patent is extended or adjusted under 35 U.S.C. 154(b) by 368 days.

(21) Appl. No.: 13/156,502

(22) Filed: Jun. 9, 2011

(65) Prior Publication Data

US 2012/0317155 A1    Dec. 13, 2012

(51) Int. Cl.
 *G06F 17/30*    (2006.01)
(52) U.S. Cl.
 CPC .... *G06F 17/30997* (2013.01); *G06F 17/30557* (2013.01); *G06F 17/30147* (2013.01)
(58) Field of Classification Search
 CPC ................................................. G06F 17/30147
 USPC ............ 707/791, 802, 803, 809, 812, 999.01; 713/320
 See application file for complete search history.

(56) References Cited

U.S. PATENT DOCUMENTS

| | | | |
|---|---|---|---|
| 6,324,581 B1 | 11/2001 | Xu et al. | |
| 2006/0015529 A1* | 1/2006 | Yagawa | 707/104.1 |
| 2007/0061373 A1* | 3/2007 | Kilday | 707/200 |
| 2008/0021865 A1 | 1/2008 | Corkill et al. | |
| 2008/0229025 A1* | 9/2008 | Plamondon | 711/126 |
| 2010/0313044 A1* | 12/2010 | Rajpal et al. | 713/320 |
| 2010/0332401 A1 | 12/2010 | Prahlad et al. | |
| 2011/0072489 A1 | 3/2011 | Parann-Nissany | |
| 2011/0161293 A1* | 6/2011 | Vermeulen et al. | 707/626 |

FOREIGN PATENT DOCUMENTS

| | | | |
|---|---|---|---|
| JP | 2005-502121 A | 1/2005 | |
| JP | 2009-525534 A | 7/2009 | |
| JP | 2009-537918 A | 10/2009 | |
| WO | WO 03/021441 A1 | 3/2003 | |
| WO | WO 2007/089354 A1 | 8/2007 | |
| WO | WO 2007/134918 A1 | 11/2007 | |

OTHER PUBLICATIONS

PCT International Search Report dated Aug. 10, 2012 and Written Opinion (Nine (9) pages)).
Extended European Search Report dated Jul. 7, 2015 (Eight (8) pages).
Japanese Office Action issued in Japanese counterpart application No. 2012-128578 dated Feb. 23, 2016, with partial English translation (Six (6) pages).

\* cited by examiner

*Primary Examiner* — Syling Yen
(74) *Attorney, Agent, or Firm* — Crowell & Moring LLP

(57) ABSTRACT

A hybrid data management/storage system is provided which includes two or more integrated or connected data management systems. An external application and/or user interacts with the hybrid data management/storage system using a unified interface. Incoming raw data may be directed to be stored in any of a plurality of data management systems based on the incoming data object having one or more of a number of predefined characteristics, including for example size and/or data type. Metadata corresponding to all incoming data objects may be stored in a particular data store, regardless of whether the incoming object's raw data is stored in a different one of the plurality of data stores.

20 Claims, 4 Drawing Sheets

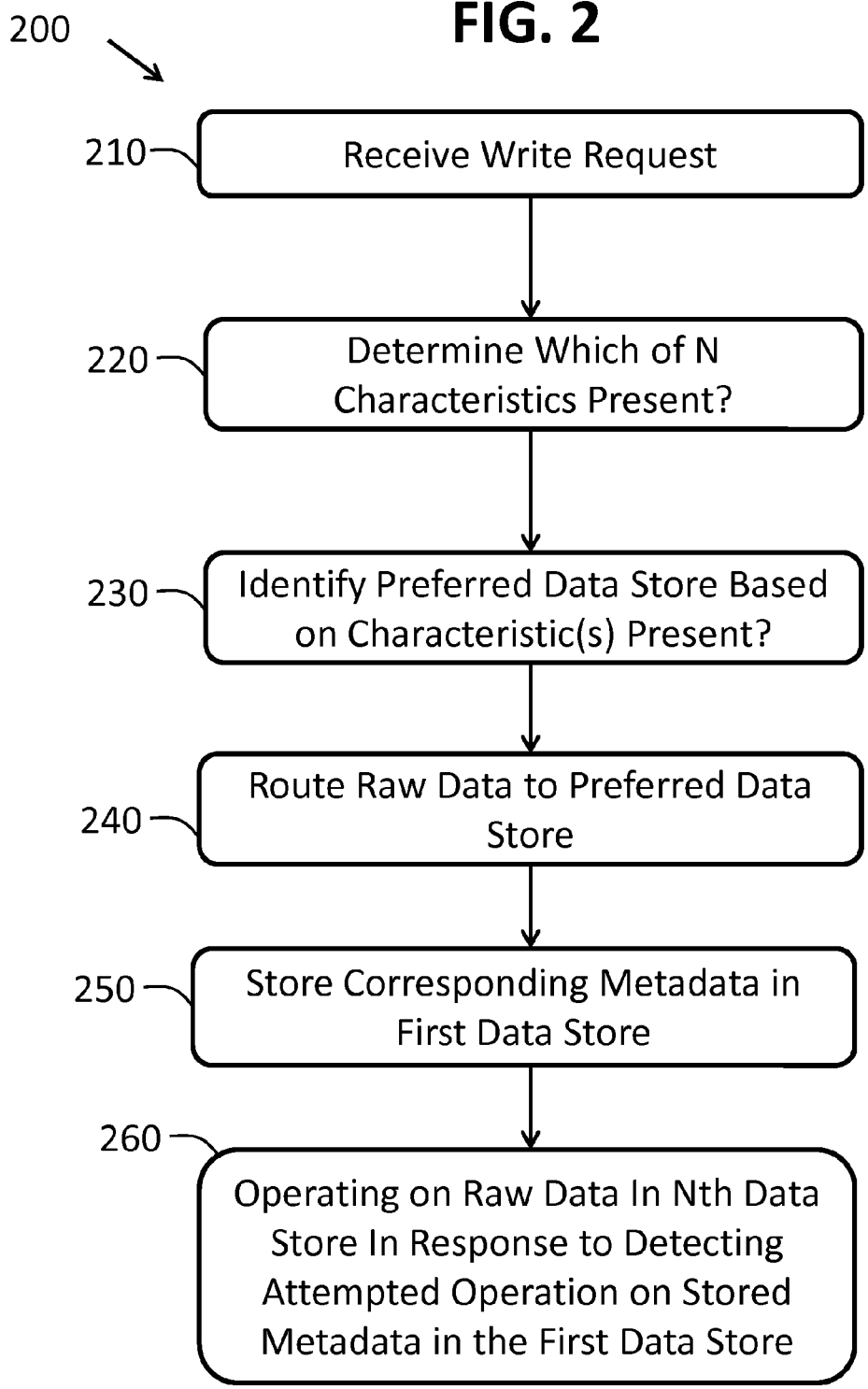

HYBRID DATA MANAGEMENT SYSTEM AND METHOD FOR MANAGING LARGE, VARYING DATASETS

FIELD OF THE INVENTION

The present invention relates generally to data management systems, and more particularly to an integrated hybrid data management system for more efficient managing of large and varying datasets.

BACKGROUND OF THE INVENTION

While the rise of the Internet has solved some data management problems, at the same time it has created some new ones as well. For example, many Internet applications, such as e-commerce, e-mail, and social media applications, have created a so-called 'big data' problem. The 'big data' problem results from the vast volumes of data, much of which is generated at very high velocities and with widely varying formats and lengths. In general, the term 'big data' refers to datasets that have grown so large that they are beyond the ability of commonly-used database management tools to capture, manage and process within a tolerable period of time. Such datasets can range from a few dozen terabytes to many petabytes of data, all within a single data set. Thus, 'big data' comprises billions of potentially non-uniform data objects that are generated daily, must be accessible at an instant, and yet must be stored reliably and cheaply for potentially long periods of time.

A new class of distributed storage systems, called NoSQL or 'big data' databases, has recently emerged. Examples of such database management systems include HBase, Cassandra, MongoDB, Hibari®, etc. While such databases do not provide the richness of traditional SQL databases, they are very efficient in storing and retrieving large volumes of data in a relatively cheap and reliable manner. Such NoSQL-based systems are also readily scalable in that heterogeneous servers can be added at any time to networked server clusters, followed by the data being automatically rebalanced and distributed without disruption to service.

However, in order to achieve such high performance and scalability, these NoSQL-based systems must be optimized for specific data types. For example, Cassandra is optimized to handle very fast writes of many small data items, but conversely performs relatively poorly when many large data items are written to the database. No prior art solution is optimal for vastly different data types.

One potential solution would be to deploy different solutions for different data types; for example, store large data in a file system but keep small data objects in a NoSQL database. However, this approach is unsatisfactory since it multiplies the number of systems and software that must be maintained. Moreover, synchronizing usage across different databases is likely to be difficult, and enforcing a usage policy (say some bytes/second limit) for a user who happens to have both large and small data would require synchronizing two different systems in real time. It is also questionable if this approach would even function in a large scale 'big data' environment. This approach also does not readily scale to N systems since the management and synchronization overhead increases as N increases.

Accordingly, there is a need for an integrated hybrid data management system which is capable of efficiently handling varying types of 'big data.'

SUMMARY OF THE INVENTION

Disclosed and claimed herein is a hybrid data management system and method for providing a hybrid data management system. In one embodiment, a method for providing a hybrid data management system, having a plurality of data stores, includes receiving, from an external source, a write request for an incoming data object, and then determining if the incoming data object has one or more of a plurality of predefined characteristics. Therefore, the method includes identifying which of the plurality of data stores is a preferred data store for the incoming data object based on the one or more plurality of predefined characteristics that the incoming data object is determined to have, and correspondingly routing the incoming data object's raw data to the identified preferred data store for storage. Finally, the method includes storing metadata associated with the incoming data object in a first data store of the plurality of data stores without regard to which of the plurality of data stores is the preferred data store having the incoming data object's raw data, where the metadata includes associative information linking a particular metadata entry with the corresponding data object's raw data in the preferred data store.

Other aspects, features, and techniques of the invention will be apparent to one skilled in the relevant art in view of the following description of the exemplary embodiments of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 2 is a process for implementing a hybrid database management system for managing large and varying datasets, in accordance with the principles of the invention.

DETAILED DESCRIPTION OF THE EXEMPLARY EMBODIMENTS

Overview of the Disclosure

Figure 1A:
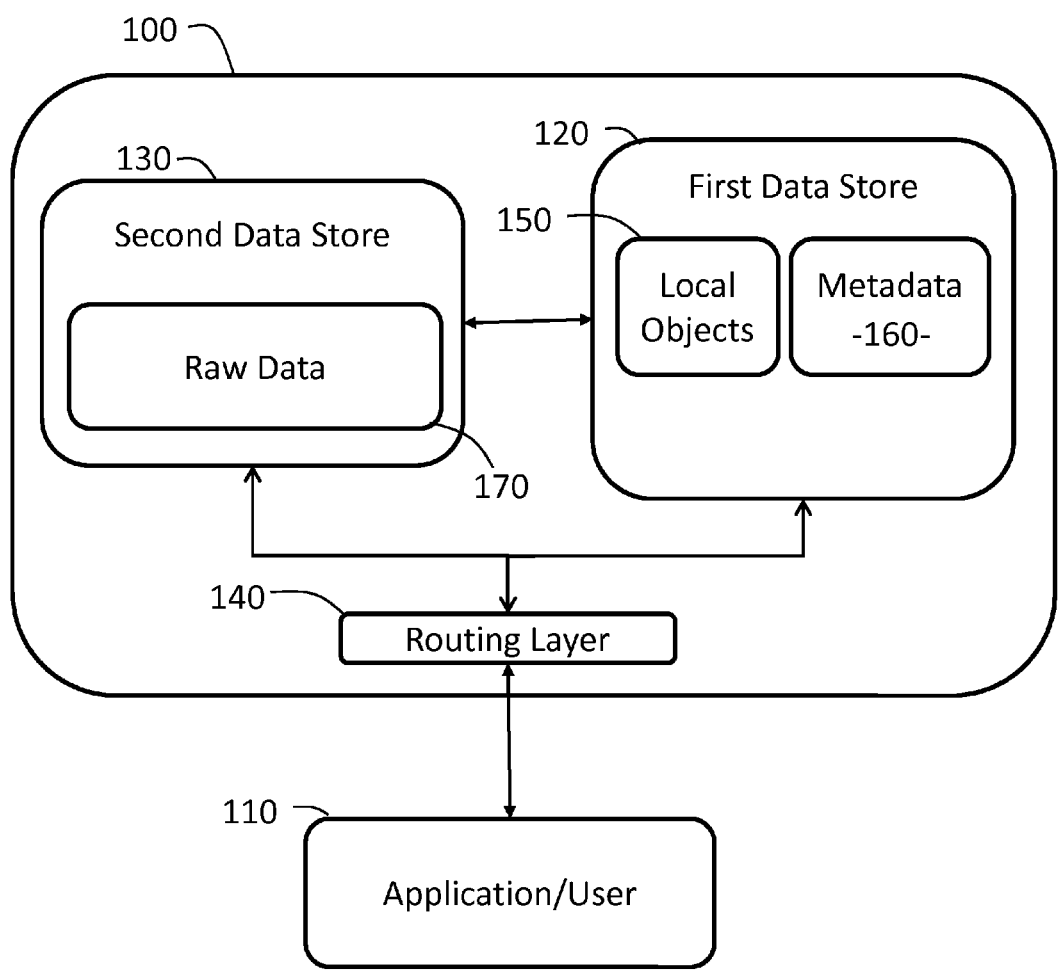
FIGS. 1A-1B illustrates two exemplary hybrid database management systems for managing large and varying datasets, in accordance with the principles of the invention.

The present disclosure relates generally to a hybrid data management/storage system which is comprised of two or more integrated data management systems. Metadata is used to link the data in a first data management system (e.g., small data store, such as NoSQL database) with the data in at least one additional connected data management system (e.g., large data store, such as an OS file system).

The above metadata linkage may allow the first data management system to share all the same algorithms for data management in a distributed system, e.g., partitioning, replication, migration (in the case of scale-out), repair (in the case of recovery from a failure), backup, etc., with the one or more connected additional data management systems, and therefore leverage the benefits of each since different types of data management system may tend to operate more efficiently on certain types/sizes of data than on other types/sizes, but without the complexities of using different data management algorithms in each type of system. To that end, another aspect of the invention is to determine one or more characteristics of an incoming data object and, based on the presence of such characteristics, direct the underlying raw data of the incoming object to one of the connected database management system that is most suited or configured for the storage and management of such data. For example, some data stores may contain additional indexing/searching functionality that is specific to a particular data type and, therefore, could store and mange such data in a more efficient manner than other data stores.

It should further be appreciated that raw data of an incoming object may be simultaneously stored in more than one data store. For example, an email object might be stored in one store optimized for mail store and retrieval, and in another store simultaneously that is optimized for indexing and searching. The metadata corresponding to such data may then reflect the linkage to both such data stores.

With respect to the data characteristics that may be considered, such characteristics may include the data object's size and/or data type (media data versus text data). Additional characteristics may include access pattern information corresponding to the access pattern or quality of service for the data object, such as the fact that the data object will be rarely accessed or modified, versus frequently modified, or that the incoming data object is from a user that is a different price plan so it can be stored in slower/cheaper data store. Additional object characteristics may further include strong or weak consistency (write to return after all replicas updated, or after some replicas updated), as well as remote versus local (application specifies this data object must be replicated to at least one remote data center).

For example, by way of providing a non-limiting example, some databases (e.g., MongoDB) may be better optimized for the storage of documents having a particular structure (e.g., JavaScript Object Notation). Such a database may tend to perform less efficiently when storing data that is not of the preferred structure. In such cases, the present invention would allow such a database to receive the data object, recognize that it is of an undesirable structure, and pass it to a separate, linked database that is more suited for the type of received data object.

Another aspect of the invention is to enable an external source, such as an application or user, to interface with only a single data store. This initial or first data store may use the same metadata structure for all data objects, while selectively storing the underlying raw data forming the objects in one of the plurality of connected data management systems. In this fashion, the management functions from this first data store (where all metadata is stored since it is of a data size that is most suitable for storage in the first data store) can be used to manage a plurality of additional connected data stores, rather than having each of the separate data stores rely on their own management functions. Since the plurality of connected data stores are able to piggyback off of the management functions of the first data store, the only data store to which the user/application interfaces, the overall complexity of the system can be greatly reduced.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor executable storage medium. The "processor executable storage medium" may include any medium that can store information. Examples of the processor executable storage medium include an electronic circuit, a semiconductor memory device, a ROM, a flash memory or other non-volatile memory, a floppy diskette, a CD-ROM, an optical disk, a hard disk, etc.

The term "server" means a functionally-related group of electrical components (e.g., processor, memory, network interface, etc.) such as a computer system in a networked environment which may include both hardware and software components, or alternatively only the software components that, when executed, carry out certain functions. The "server" may be further integrated with one or more database management systems with comprise one or more associated databases.

The term "database management system" means one or more computer program that control the creation, maintenance, and the use of an integrated collection of data records, files, and other data objects which are stored on processor readable media. The database management system is usable by external sources (e.g., applications/users) to access and manipulate the stored data, as well as enforce data integrity, security, manage concurrent accesses, and recover/restore data.

Overview of an Exemplary Online Environment

FIG. 1A depicts one embodiment of a hybrid data management systems 100 configured to implement one or more aspects of the invention. In the example of FIG. 1A, the system 100 is comprised of one or more servers that are accessible by an external source in the form of application/user 110 which is configured to interface with a first database management system—the first data store 120, which may be a NoSQL-based database system. Moreover, the first data store 120 may be similarly configured to communicate with a second database management system—the second data store 130, which may comprise a file system that is optimized for storage of large data blocks (e.g., Linux ext3, Linux ext4, Hadoop Distributed File System, etc.). While the hybrid data management systems 100 is comprised of only two data stores, it should be appreciated that N additional data stores may be similarly connected to the first data store 120, such as is the case in the exemplary system described below with reference to FIG. 1B. In any event, such file systems may be any local file system having basic data management features for distribution, replication, etc, as well as simple block data storage systems such as CDROM, DVD, magnetic tape system, etc.

The first data store 120 may be configured to provide built-in functionality for data partitioning, automatic replication, incremental backups, node expansion, quorum calculation, etc. It should be appreciated that the first data store 120 may be implemented as a NoSQL-type database such that, for smaller data sizes, it is able to provide higher performance due, for example, to the efficient write and read paths using a write-ahead log, in-memory cache, and other features.

One aspect of the invention is to recognize that data objects having certain characteristics, such as the size or type of the data objects, may be more efficiently stored and managed by a different type of data store, such as the second large data store 130. In this fashion, the invention provides a hybrid database solution which improves overall performance by storing certain data objects (e.g., small data objects) in the first data store 120 (e.g., a NoSQL-type database), while moving the raw data of other types of data objects (e.g., large data objects) into the second data store 130 (e.g., file system).

When the data object characteristic under consideration is the object's size, it should be appreciated that the threshold of what comprises small data objects versus large data objects may depend, at least in part, on the particular system hardware and workload. Thus, the threshold may be a user-definable property of the system 100. For example, typical databases for storing and managing social networking data tend to be optimized for data objects in the 1K to 10K range. For such systems, a data object that is greater than 100K may be considered large. Similarly, databases optimized for email data tend to store data in the 1K to 100K as a normal case. For such databases, a data object of greater than 1M may be considered "large", such as those emails with large file attachments. As technology evolves, these ranges are likely to evolve as well. However, the problems of attempting to store and manage disparate data on a particular database will likely persist.

In certain embodiments, the first data store 120 may further be configured to determine how particular incoming data (e.g., from application/user 110) should be stored in the envisioned distributed manner. By way of a non-limiting example, a routing layer 140 may first determine, based on a comparison of the size of an incoming data object to a threshold value, that the incoming data object should be stored in the first data store 120, or alternatively in a file system that is comprised of the second data store 130. Although the routing layer 140 may be implemented as a proxy layer, it may equally be implemented in numerous other forms of decision logic, either in the form of software, hardware or a combination thereof.

If the routing layer 140 determines that a particular incoming data object has one or more particular characteristics for which the first data store 120 is preferably configured (e.g., smaller than a predefined threshold value), then the incoming object would be stored with the local objects 150. Metadata for the local data objects 150 may similarly be stored as separate metadata 160, as shown in FIG. 1A. While in certain embodiments the metadata for the local data objects 150 may be stored separately as metadata 160, in other embodiments such metadata may be stored together with the underlying raw data, as local data objects 150. Such metadata may be referred to as local-object metadata since the information corresponds to an object which has been stored locally, i.e., in the first data store.

If, however, the routing layer 140 determines that the particular incoming data object has one or more particular characteristics for which the second data store 130 is better configured (e.g., larger than the predefined threshold value), then the raw data of the incoming object would be passed to the second data store 130 and stored as raw data 170.

Additionally, metadata for each such incoming data object whose raw data is stored in the second data store 130 (as raw data 170) may nonetheless be stored by the first data store 120 as metadata 160. Such metadata may be referred to as remote-object metadata since the information corresponds to an object which has been stored remotely, i.e., in the second data store. Moreover, such metadata 160 may comprise descriptive information for such large data objects, and may further include associative information that links a particular metadata entry with the corresponding raw data 170 to which it pertains. Each such metadata entry may include, for example, content-type, access control list, etc. The size of the metadata per object should preferably be small, such as on the order of a few hundred bytes.

The above-referenced remote-object metadata may be described as a placeholder object such that, when management and/or access operations are performed on it in the first data store 120, the data management system 100 automatically undertakes a corresponding operation on the associated raw data in whichever data store it is stored. In this fashion, only the data management functions of the first data store 120 need be used. However, it may be the case that utilizing the data management functions of the first data store 120 may result in some unintended negative impact on performance. For example, in the event that the first data store 120 writes all updates to data objects in a RAM and disk cache, the RAM and disk cache may fill up quickly when many big data objects are to be written. In such cases, it is a further aspect of the invention to selectively bypass the data management function of the first data store 120, and instead directly utilize the corresponding functions (i.e., read/write) of the particular data store at issue.

Figure 1B:
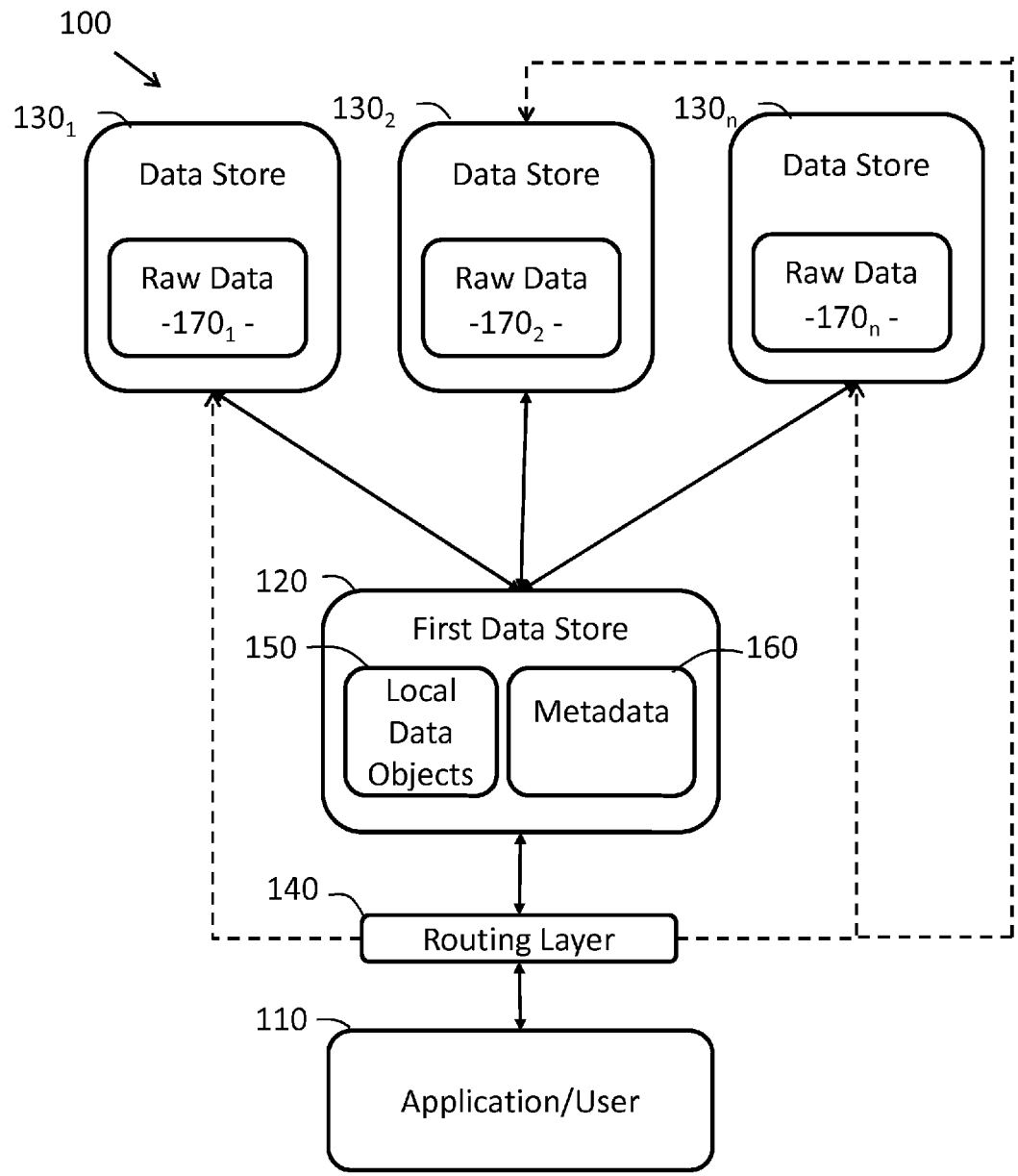

With reference now to FIG. 1B, depicted is another example of the hybrid data management systems 100 configured with a plurality of data stores 130$_{1-n}$, in addition to the first data store 120 with which the application/user 110 interfaces directed. All of the description set forth above with respect to FIG. 1A is hereby incorporated and applicable to the example of FIG. 1B.

As with the example of FIG. 1A above, the first data store 120 may be configured to provide built-in functionality for data partitioning, automatic replication, incremental backups, node expansion, quorum calculation, and may be implemented as a NoSQL-type database such that, for smaller data sizes, it is able to provide higher performance.

As described above, the first data store 120 may further be configured to determine how particular incoming data (e.g., from application/user 110) should be stored based on the incoming data object having one or more recognized characteristics. As such, the routing layer 140 may be configured to first determine certain characteristics of the incoming data object. The routing layer may determine which of the available data stores should be used to store the raw data for the incoming object. As previously mentioned, this determination may be based on identifying which of the available data stores is best configured to store and manage data having the one or more determined characteristics.

Additionally, metadata corresponding to the incoming data object may then be stored preferably in the first data store 120 and without regard to which of the plurality of data stores (e.g., first data store 120 and plurality of additional data stores 130$_{1-n}$) was used to store the corresponding raw data.

While FIGS. 1A-1B set forth two exemplary system configurations for implementing hybrid data management systems in accordance with the principles of the invention, it should further be appreciated that other known or obvious design variations are equally envisioned and within the scope of the disclosure.

Referring now to FIG. 2, depicted is one embodiment of a process for managing large and varying datasets, in accordance with the principles of the invention. In particular, process 200 begins at block 210 when a hybrid data management system (e.g., system 100 of FIGS. 1A-1B) receives a write request from an external source (e.g., application/user 100 of FIGS. 1A-1B), such as in the form of a 'PUT' object operation. It should be appreciated that such object operations may be in any protocol, such as S3 or HTTP.

The incoming object may have one or more predetermined characteristic which may be detected/determined before the object is written/stored by the system. To that end, at block 220 of process 200 a determination may be made as to which of N possible predefined characteristics the incoming data object may have. In certain embodiments, one of the predefined characteristics may be a particular size range, data type, frequency or pattern of accesses/modifications, quality of service, etc.

Once it is determined which of the predetermined N characteristics are present in the incoming data, process 200 may continue to block 230 where the process may then identify which of a plurality of connected data stores (e.g., first data store 120, plurality of data stores 130$_{1-n}$, etc.) would be preferable for storage of the incoming data object's raw data. In certain embodiments, this determination may be based on identifying which of the available data stores is more optimally configured (optimized) to store data exhibiting the determined characteristic(s) from block 220.

Process 200 may then continue to block 240 where the incoming data object's raw data may then be routed to the identified preferred available data store. Then, at block 250, metadata associated with the incoming data object may be stored in the first data store. In certain embodiments, such metadata may be stored in the first data store without regard to whether the incoming data object's raw data was stored in the first data store or in any of the other available data stores. Such metadata may comprise associative information linking a particular metadata entry with the corresponding data object's raw data (e.g., location information in the form of a URL, path name, ID, etc.). Additionally, the reference metadata may further include information about the type of data in the corresponding data object, size, name, owner, last modified time, access control rules, access statistics, etc.

Continuing to refer to FIG. 2, process 200 may then continue to block 260 where the process operates (read, move, delete, modify etc.) on raw data stored in the Nth data store in response to detecting an attempted operation on the associated metadata that was previously stored in the first data store. In this fashion, 'big data' of varying types can be more efficiently stored and managed.

Figure 3:
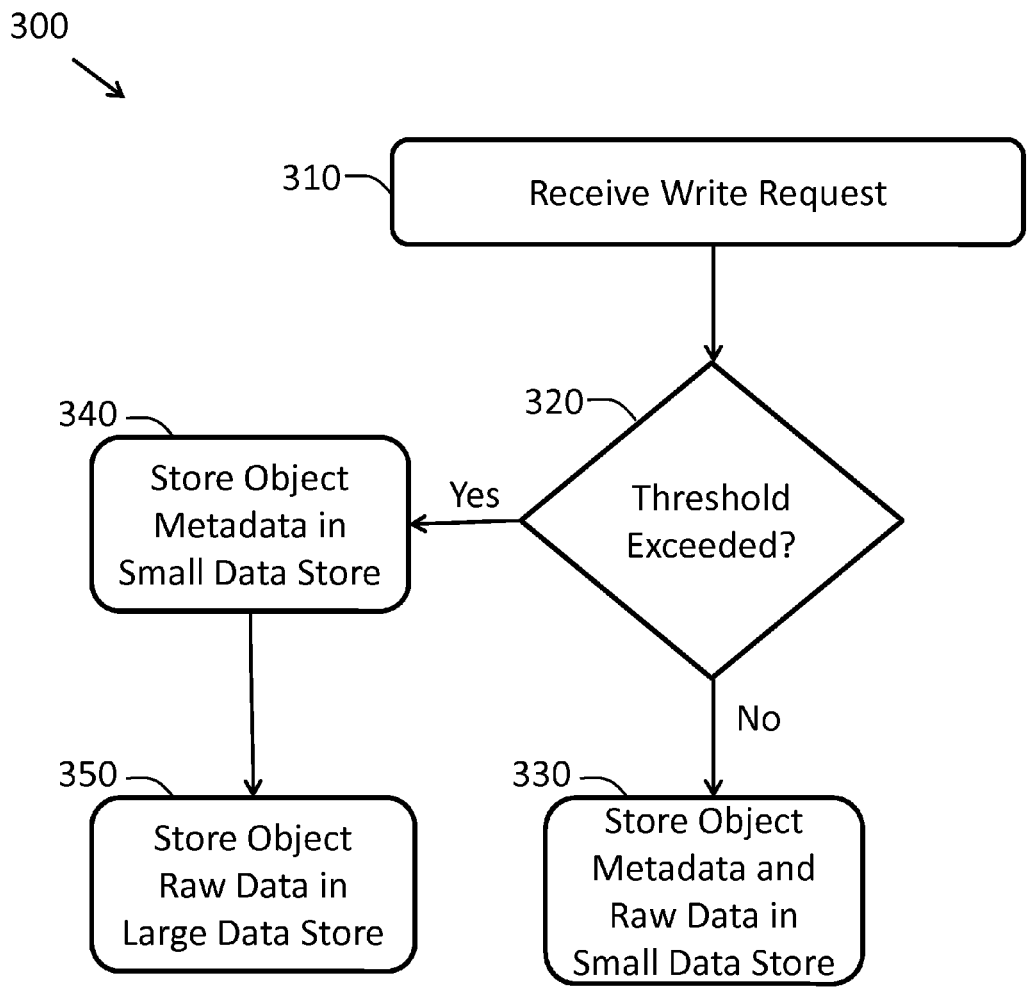
FIG. 3 is one example of the process of FIG. 2 above for implementing a hybrid database management system that more efficiently stores and manages both small and large data datasets.

Referring now to FIG. 3, depicted is a particular embodiment of a process for managing large and varying datasets, in accordance with the principles of the invention. Specifically, process 300 of FIG. 3 represents a more specific example of the process 200 of FIG. 2 in which the predefined characteristic is a size threshold value that functionally distinguishes small data objects from large data objects. For example, the first characteristic could be represented as an object size range of 0 up to the threshold value, while the second characteristic could be represented as an object size range that begins at the threshold value up to a system-imposed maximum object size.

It should be appreciated that the concept of what constitutes large data versus what constitutes small data may be system- or application-specific. As such, the invention is not predicated on particular data sizes. Rather, all that is required is a user- or system-definable characteristic, such as a threshold value, be used to differentiate when data will be treated as large data and when it will be treated as small data.

Similar to process 200 described above, process 300 begins at block 310 when a hybrid data management system (e.g., system 100 of FIGS. 1A-1B) receives a write request from an external source (e.g., application/user 100 of FIGS. 1A-1B), such as in the form of a 'PUT' object operation. The incoming object may have an associated content-length header that includes the overall size of the incoming object that is to be written to the database. At a routing layer (e.g., routing layer 140 of FIGS. 1A-1B), for example, the content-length may be compared to the predetermined, user-definable threshold value (block 320). If the content-length is less than (or even equal to) the threshold value, process 300 may continue to block 330 where the incoming data object is stored in the small data store. In certain embodiments, metadata for the incoming object may similarly be stored in the small data store.

If, on the other hand, it is determined at block 320 that the content-length in fact exceeds the threshold, then metadata for the incoming larger object may be stored in the small data store at block 340, while the underlying raw data of the object is passed to and stored in a large data store (block 350). It should additionally be appreciated that the metadata for the large object stored at block 340 may further include associative information indicating that the underlying raw data is in fact being stored in the large data store.

A function call to the large data store may be used by the routing layer to determine which node(s) in the large data store should be written to. In certain embodiments, the raw data for the incoming object may be written to the large data store as a single file in a configured directory. However, in the case of multi-part data uploads to the hybrid database system, it should be appreciated that each data part may be stored as a separate file. Changes to the threshold value may only affect newly-incoming data object requests, and not otherwise affect the location of already-stored objects.

With respect to the large data store, it may be preferable to avoid writing the large data objects to a single directory since the number of files may be relatively large, depending of course on how low the threshold value has been set. In order to maximize performance, the large data store may be configured with a top-level directory which contains one or more group-level subdirectories for each of a number of defined groups. Within each group-level directory there may be one or more additional user-level subdirectories for each registered user. In each user-level subdirectory, an indirection layer may be used to designate or otherwise identify each stored object. By way of example, a 2-letter prefix of the hash value of the object in question may be used In the event that a 'GET' object request is received by the hybrid database system, the proxy layer may be configured to first retrieve the requested object's metadata stored in the small data store. The retrieved metadata will indicate if the requested object is in fact stored in the small data store, or has been stored in the large data store due to its size. The requested object may then be read from the identified location.

In the event that a 'DELETE' object request is received by the hybrid database system, the proxy layer may further be configured to first retrieve object's metadata stored in the small data store. Again, the retrieved metadata will indicate if the object is stored in the small data store or in the large data store. The identified object may then be deleted from the identified location.

It should further be appreciated that when a node is added, removed or its key range changed, the raw data must be moved from one node to another. In the case of at least some NoSQL-type database systems, the data to be moved may first be identified by the associated key range, then the raw data may be streamed from the source node(s) to the destination node(s). In the event that the raw data to be moved is being stored by the large data store (e.g., large data store 130), the associated metadata being stored by the small data store (e.g., small data store 120) may be similarly read and updated to reflect the moved data's new location.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for storing an incoming data object including metadata having first preferred predefined characteristics and raw data having second preferred predefined characteristics, the method comprising the acts of:
   providing a hybrid data storage management system comprising:
      a plurality of data stores including at least a first data store and a second data store different from the first data store,
      wherein each of the plurality of data stores is associated with a preferred data store type corresponding to a type of data store whose storage method permits the associated data store to operate more efficiently on data having preferred predefined characteristics associated with the data store type than on data not having the preferred predefined characteristics,
      wherein the first data store is a first preferred data store having a first preferred data store type corresponding to first preferred predefined characteristics, and the second data store is a second preferred data store having a second preferred data store type corresponding to second preferred predefined characteristics;
   receiving, by the hybrid data management system, from an external source, a write request for the incoming data object;
   determining, by the hybrid data management system, that the metadata and the raw data of the incoming data object have the first and second preferred predefined characteristics, respectively;
   identifying, by the hybrid data management system, the first and second preferred data store types corresponding to the metadata and the raw data, respectively, based on the first and second preferred predefined characteristics;
   routing, by the hybrid data management system, the raw data to the second data store for storage therein based on the raw data having been identified as corresponding to the second data store type; and
   storing, by the hybrid data management system, the metadata in the first data store based on the metadata having been identified as corresponding to the first data store type, and without regard to which of the plurality of data stores is the second preferred data store corresponding to the raw data of the incoming data object, the metadata including associative information linking the metadata with the corresponding raw data in the second data store,
   wherein the first data store and the second data store utilize different storage methods for at least one of data replication, retention and distribution, such that, by virtue of a first data store storage method, the first data store operates more efficiently on the metadata than the second data store would, and, by virtue of a second data store storage method, the second data store operates more efficiently on the raw data than the first data store would.

2. The method of claim 1, further comprising operating on the raw data in the second data store in response to detecting an attempted operation on the metadata in the first data store.

3. The method of claim 2, wherein the attempted operation corresponds to one of moving, deleting, modifying and copying the incoming data object.

4. The method of claim 1, wherein the external source is an external application or user, and the write request is a PUT object operation.

5. The method of claim 1, wherein the predefined characteristics include a predefined data object size.

6. The method of claim 1, wherein the predefined characteristics include a predefined data type.

7. The method of claim 1, wherein said associative information comprises information indicating a location within the second data store where the corresponding raw data is stored.

8. The method of claim 1, further comprising:
   receiving, by the hybrid data management system from an external application or user, a read request for a previously-stored data object;
   retrieving metadata stored in the first data store corresponding to the previously-stored data object, wherein such metadata indicates a location within the second data store where the corresponding raw data is stored; and
   reading the previously-stored data object from the location indicated by the metadata.

9. The method of claim 1, further comprising:
   utilizing data management functions of the first data store for operating on the incoming data object stored in the second data store.

10. The method of claim 9, further comprising:
    determining that utilizing a particular data management function of the first data store will have a negative performance effect on the hybrid data management system, and
    in response, bypassing the particular data management function of the first data store to use a corresponding data management function of the second data store to avoid the negative performance effect.

11. A computer program product comprising a computer executable non-transitory storage medium having executable code embodied thereon to perform a hybrid data management process for storing an incoming data object using a plurality of data stores, the data object including metadata having first preferred predefined characteristics and raw data having second preferred predefined characteristics, the plurality of data stores including at least a first data store and a second data store different from the first data store, each of the plurality of data stores being associated with a preferred data store type corresponding to a type of data store whose storage method permits the associated data store to operate more efficiently on data having preferred predefined characteristics associated with the data store type than on data not having the preferred predefined characteristics, the first data store being a first preferred data store having a first preferred data store type corresponding to first preferred predefined characteristics, the second data store being a second preferred data store having a second preferred data store type corresponding to second preferred predefined characteristics, the computer executable code, when executed by the computer, causing the computer to:

receive, from an external source, a write request for the incoming data object;

determine that the metadata and the raw data of the incoming data object have the first and second preferred predefined characteristics, respectively;

identify the first and second preferred data store types corresponding to the metadata and the raw data, respectively, based on the first and second preferred predefined characteristics;

route the raw data to the second data store for storage therein based on the raw data having been identified as corresponding to the second data store type; and store the metadata in the first data store based on the metadata having been identified as corresponding to the first data store type, and without regard to which of the plurality of data stores is the second preferred data store corresponding to the raw data of the incoming data object, the metadata including associative information linking the metadata with the corresponding raw data in the second data store, wherein the first data store and the second data store utilize different storage methods, including for at least one of data replication, retention and distribution, such that, by virtue of a first data store storage method, the first data store operates more efficiently on the metadata than the second data store would, and, by virtue of a second data store storage method, the second data store operates more efficiently on the raw data than the first data store would.

12. The computer program product of claim 11, wherein the executable code, when executed by the computer, further causes the computer to:

operate on the raw data in the second data store in response to detecting an attempted operation on the metadata in the first data store.

13. The computer program product of claim 12, wherein the attempted operation corresponds to one of moving, deleting, modifying and copying the incoming data object.

14. The computer program product of claim 11, wherein the write request for the incoming data object is a PUT object operation.

15. The computer program product of claim 11, wherein the predefined characteristics include a predefined data object size.

16. The computer program product of claim 11, wherein the predefined characteristics include a predefined data type.

17. The computer program product of claim 11, wherein said associative information comprises information indicating a location within the second data store where the corresponding raw data is stored.

18. The computer program product of claim 11, wherein the processor executable non-transitory storage medium further includes:

processor executable program code to receive, from the external application or user, a read request for a previously-stored data object, processor executable program code to retrieve metadata stored in the first data store corresponding to the previously-stored data object, wherein such metadata indicates a location within the second data store where the corresponding raw data is stored, and processor executable program code to read the previously-stored data object from the location indicated by the metadata.

19. The computer program product of claim 11, wherein the first data store further comprises data management logic, and wherein the executable program code, when executed by the computer, causes the computer to:

utilize the data management logic of the first data store for operating on the incoming data object stored in the second data store.

20. The computer program product of claim 19, wherein the processor executable non-transitory storage medium further includes:

processor executable program code to determine that utilizing a particular data management function of the data management logic for the first data store will have a negative performance effect on the hybrid data management system, and in response, and processor executable program code to bypass the particular data management function of the data management logic of the first data store to use a corresponding data management function of the second data store to avoid the negative performance effect.

\* \* \* \* \*